United States Patent [19]

Buxton et al.

[11] Patent Number: 4,693,132
[45] Date of Patent: Sep. 15, 1987

[54] DRIVE MECHANISM FOR DRAWOUT HIGH AMPERAGE MULTI-POLE CIRCUIT BREAKER

[75] Inventors: Clifford A. Buxton; David C. Higgins, both of Cedar Rapids; Gary A. Volesky, Newhall, all of Iowa

[73] Assignee: Square D. Company, Palatine, Ill.

[21] Appl. No.: 883,251

[22] Filed: Jul. 8, 1986

Related U.S. Application Data

[62] Division of Ser. No. 697,355, Feb. 1, 1985, abandoned.

[51] Int. Cl.⁴ .......................... F16H 1/16; F16D 7/04
[52] U.S. Cl. ......................................... 74/425; 464/39
[58] Field of Search .................. 74/425, 89.14; 464/39

[56] References Cited

U.S. PATENT DOCUMENTS

| | | |
|---|---|---|
| 681,476 | 8/1901 | Flautt .............................. 464/39 X |
| 902,527 | 10/1908 | French ............................ 464/39 X |
| 1,466,148 | 8/1923 | Sands ................................ 464/39 |
| 1,479,706 | 1/1924 | Fleischer ............................ 464/39 |
| 2,400,712 | 5/1946 | Prather et al. .................... 464/39 X |
| 2,491,740 | 12/1949 | Lambach ......................... 464/39 X |
| 2,714,436 | 8/1955 | Heisler ............................ 464/39 X |
| 4,506,246 | 3/1985 | Wong ................................. 335/164 |

Primary Examiner—Allan D. Hermann
Attorney, Agent, or Firm—Larry I. Golden; Richard T. Guttman

[57] ABSTRACT

An assembly for protecting a circuit breaker drawout mechanism from damage which may be caused if excessive torque is applied to operate the mechanism. The invention relates to drawout circuit breakers of the type utilizing a worm gear assembly (34, 36) to operate a driven shaft (12) to move the circuit breaker into and out of an electrical compartment. A two-part driver shaft assembly (38) is used which includes a head (50) and a driver shaft (62). The head has a collar portion (52) which includes a ridge (54) and the driver shaft is provided with a channel (68) adapted to receive the ridge. A shoulder screw (60) connects the head to the driver shaft while a coil spring (66) encircling the screw biases the head against the driver shaft, retaining the ridge within the channel unless an excessive amount of torque is applied to the head causing the ridge to slip from the channel and preventing additional torque from being imparted to the worm.

5 Claims, 10 Drawing Figures 4,693,132

DRIVE MECHANISM FOR DRAWOUT HIGH AMPERAGE MULTI-POLE CIRCUIT BREAKER

This is a divisional of co-pending application Ser. No. 697,355 filed on Feb. 1, 1985, abandoned.

FIELD OF THE INVENTION

The present invention relates in general to circuit interrupting apparatus of the drawout type and more particularly to an improved and economical scheme for preventing access to the drawout mechanism while the circuit breaker is closed and preventing the circuit breaker from being closed while it may be only partially connected to the power bus, while also preventing damage to the drawout mechanism in the event excessive torque is applied to operate the drawout mechanism.

BACKGROUND OF THE INVENTION

High amperage molded case drawout circuit breakers include some type of drawout mechanism which is ordinarily operated by a rachet mechanism or a driver shaft. It is important that the circuit breaker should not be removed from its connected position while the circuit breaker is closed, and there are accordingly numerous methods for requiring that the circuit breaker be in the open position prior to removal of the circuit breaker from its connected position. The various designs of the drawout mechanisms and casings may lend themselves to various means for preventing removal of the circuit breaker while the circuit breaker is in a connected position and "ON" and also for preventing the circuit breaker from being closed while it may be only partially connected to the power bus and also avoiding damage to the drawout mechanism which may be caused by excessive torque exerted upon the operating mechanism during insertion or withdrawal of the circuit breaker.

SUMMARY OF THE INVENTION

The present invention is for use in a drawout version of a circuit breaker of the type shown and described in U.S. application Ser. No. 493,111 filed May 9, 1983, now U.S. Pat. No. 4,506,246 by T. M. Wong for an Improved Interlock Scheme For High Amperage Molded Case Circuit Breaker which is assigned to the same assignee as the instant invention and the disclosure of which is hereby incorporated by reference.

The present invention incorporates a circuit breaker of the type described in the aforereferenced application which is additionally provided with a drawout mechanism that includes a worm gear carried on a driven shaft which extends between a pair of opposite side plates carried on the exterior sides of the molded case circuit breaker. The worm gear is operated by a worm which is controlled by a driver shaft assembly that is accessible for operation through a drawout access window carried by the circuit breaker casing. Operation of the worm gear rotates the driven shaft and causes a drive-arm assembly on each side of the circuit breaker to move the circuit breaker in either an inward direction toward a "connected" position or in an outward direction toward a "removed" position within a switchboard compartment.

Intermediate the "connected" position and the "removed" position is a "test" position at which point operation of the circuit breaker may be tested. If the operator stops operating the drawout mechanism while the circuit breaker is between the test and the connected position, the circuit breaker will be held tripped by a trip assembly coupled to a cam attached to the worm gear. The purpose of this interlock is to prevent energizing the circuit breaker with only a partial connection of the circuit breaker terminal with the power bus.

A plunger assembly which is operated by a plunger actuator that is carried by the blade carrier controls a slider that is operably associated with the access door for preventing movement of the access door from a closed position to an open position when the circuit breaker contacts are closed.

Furthermore, a driver shaft assembly which operates the worm and associated worm gear is provided with a slip clutch feature to prevent overtorquing of the drawout mechanism.

Other features of the invention will be apparent to those skilled in the art from the following specification including the appended claims and the accompanying drawings of the invention in which:

DESCRIPTION OF THE PREFERRED EMBODIMENT

Figure 1:
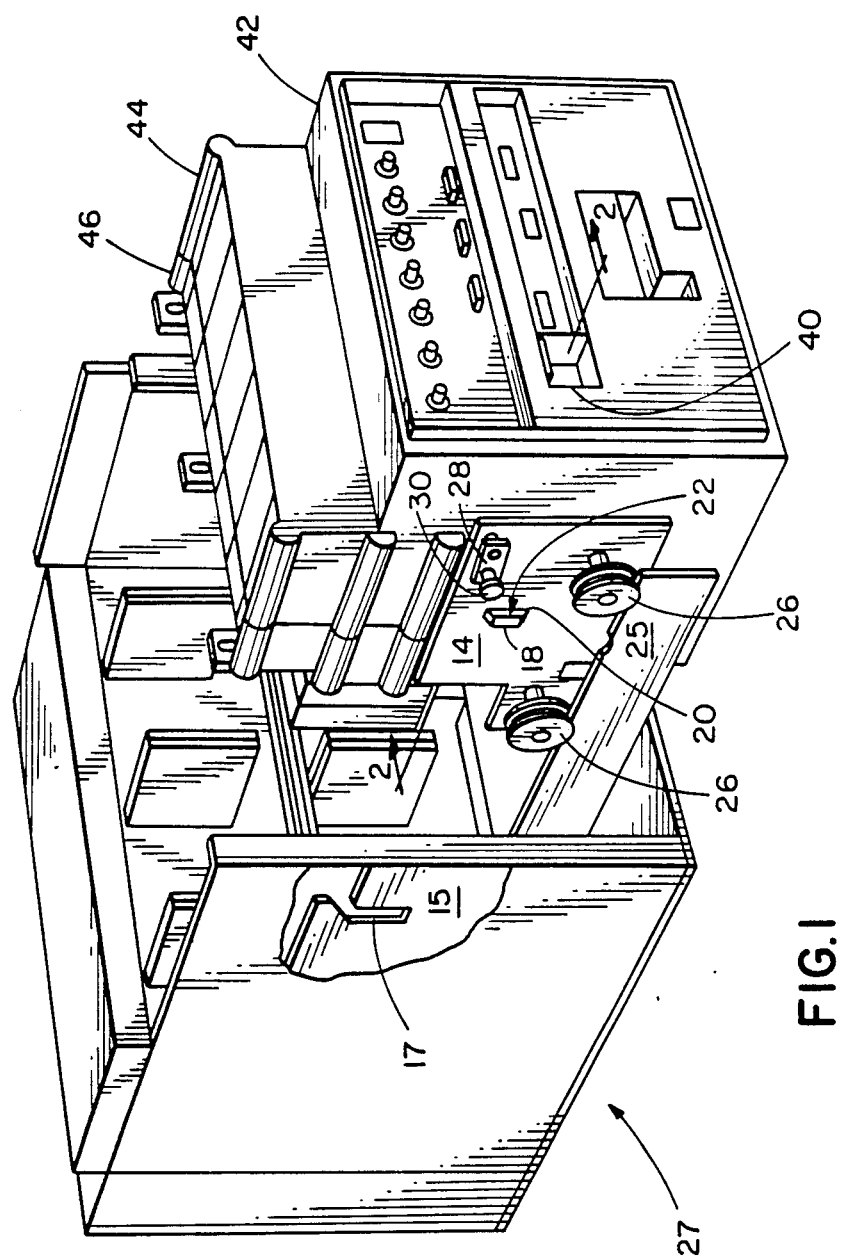
FIG. 1 is a perspective view showing the draw-out molded case circuit breaker which incorporates the interlock features of the present invention.
Figure 4:
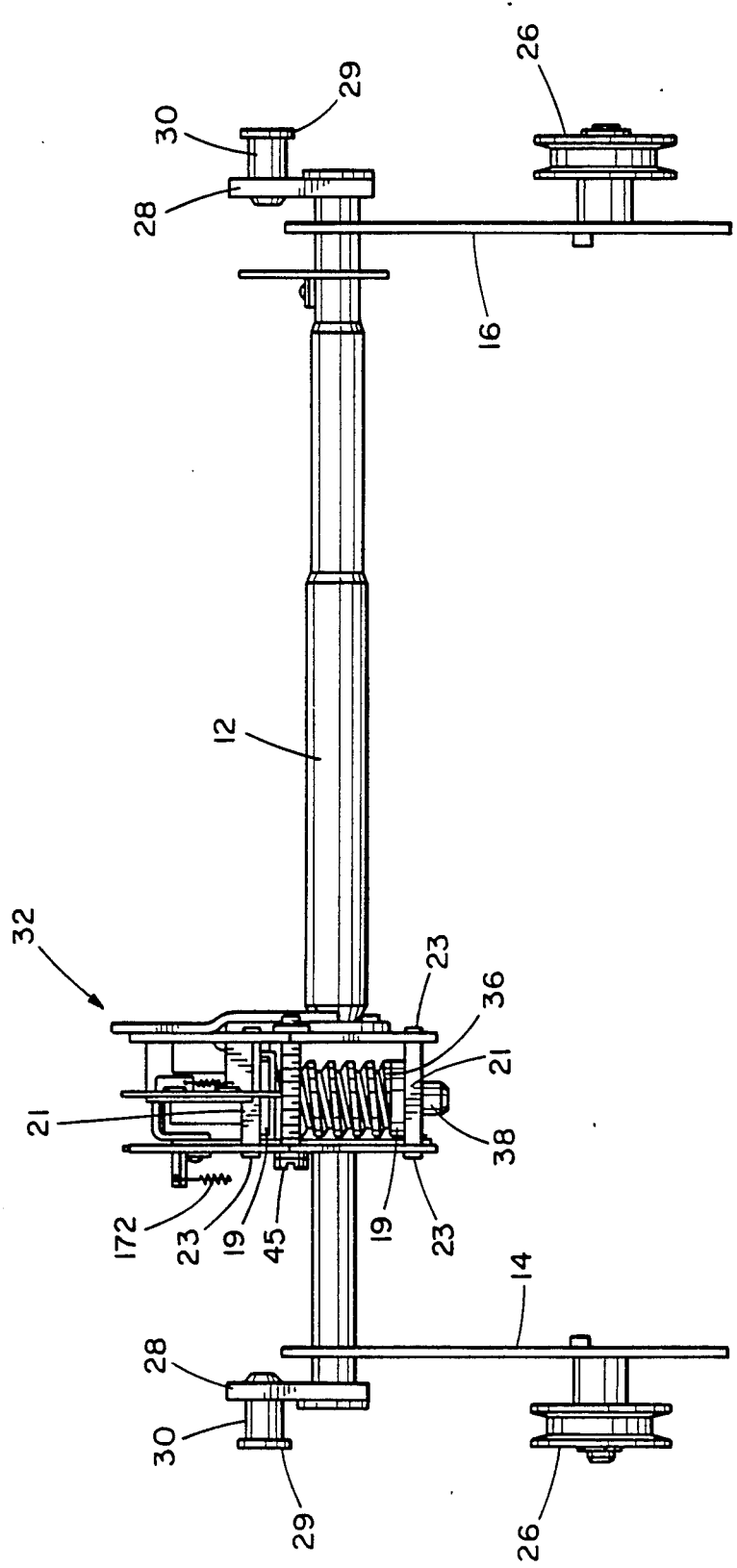
FIG. 4 is a front view of the draw-out assembly incorporating principles of the present invention showing the worm and gear assembly rotated 90° forward.
Figure 5:
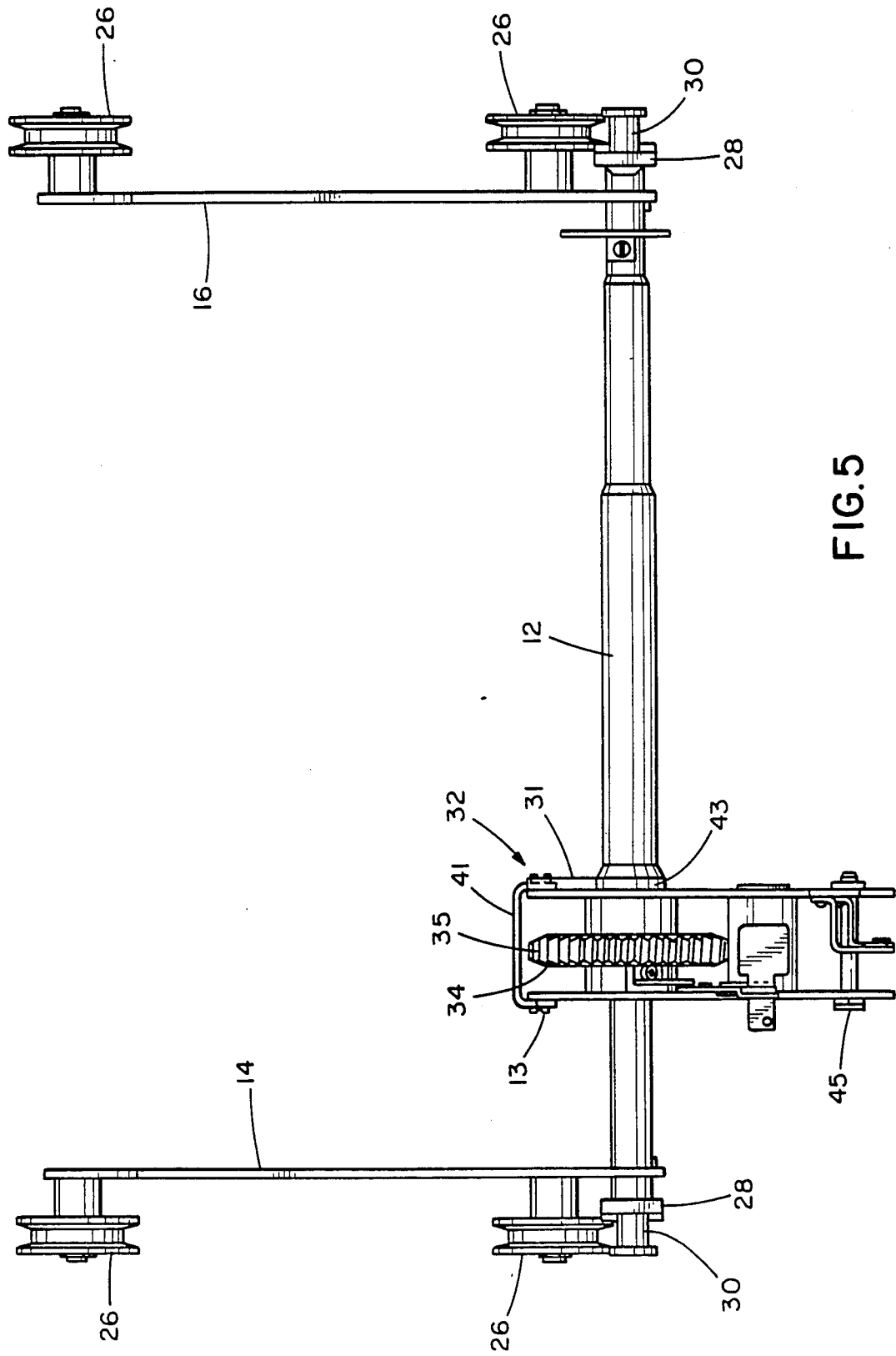
FIG. 5 is a top view of the draw-out assembly incorporating principles of the present invention showing the worm gear assembly rotated 90° forward.

As shown in FIGS. 1, 4 and 5 of the Drawings, the drawout mechanism includes a driven shaft 12 which is carried by a left side plate 14 and a right side plate 16 that are secured to the exterior of the molded casing of the circuit breaker. Embossed segments 18 of the circuit breaker casing extend through openings 20 which are provided in each of the side plates. A pin 22 extends through an aperture in segment 18 in generally parallel relationship with the side plates and retains the side plate against the side of the circuit breaker. A pair of rollers 26 are provided which extend outward from the side of each side plate and run on a track 25 provided in a switchboard compartment 27 for drawout insertion and removal of the circuit breaker. A drawout arm 28 is connected at each end of the driven shaft 12 with a drive knob 30 extending from the free end of each drawout arm. The knob 30 includes an outer lip portion 29. The knob is received within a slot 17 formed in a support plate 15 secured on each side within the switchboard compartment.

A drawout brace assembly 32 houses and supports a worm gear 34 that includes a hub 33 and circumferential teeth 35 along with an associated worm 36, the rotation of which controls rotation of the worm gear and the resultant movement of the drive knob to draw the circuit breaker in or out of the compartment 27.

The brace assembly includes a left brace plate 37 and a right brace plate 39 connected by a top brace 41 by screws 43 or some other fastening means. The worm gear 34 is connected to the driven shaft 12 by a key 47 and set screw 49. A stop lever 43 is welded to the driven shaft 12 and operatively associated with stop block 31 which is connected to the right brace plate 39 by, for example, a projection weld. The worm 36 is supported between a pair of steel supports 21 which each have a pair of ears 23 respectively received by the left brace plate 37 and the right brace plate 39. A nylon bushing 19 spaces the grooves of the worm from each of the supports 21.

Figure 6:
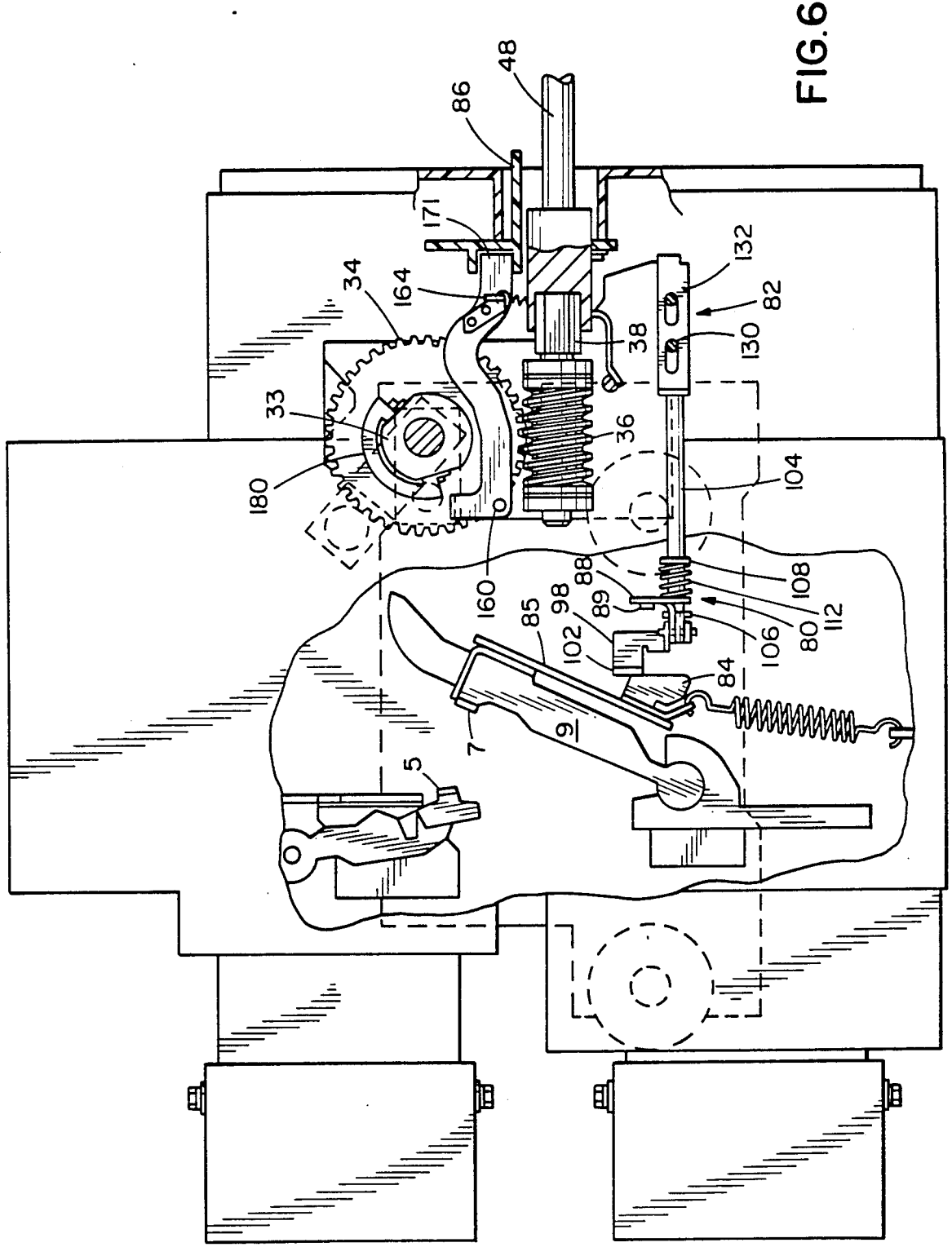
FIG. 6 is a side view as shown in FIG. 2 with the contact blades in the open position and access door opened.

The worm gear is controlled by a driver shaft assembly 38 that is recessed behind an access opening 40 provided in the auxiliary cover 42 of the circit breaker. The auxiliary or front cover is connected to the cover 44 of the circuit breaker which in turn is connected to the base 46 as shown in FIG. 1 of the Drawings. The base, cover and auxiliary cover constitute a circuit breaker casing. An operator inserts a crank 48 through the opening 40 to operate the driver shaft assembly when connecting or removing the circuit breaker as seen in FIG. 6. The brace assembly is mounted to a generally U-shaped molded portion 53 of the cover 44 by a screw 45. The molded portion 53 includes spaced apart forward legs 55 having holes 57 through which screw 45 passes and a rearward solid portion with opening 59.

Figure 9:
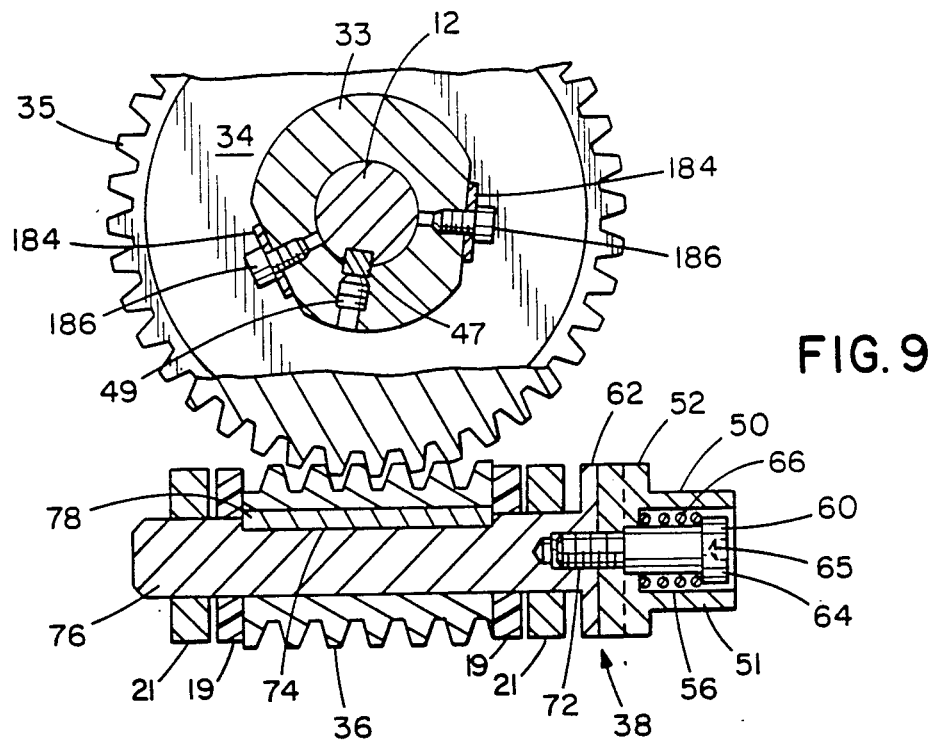
FIG. 9 is a sectional view showing the worm and gear assembly of the instant invention.
Figure 10:
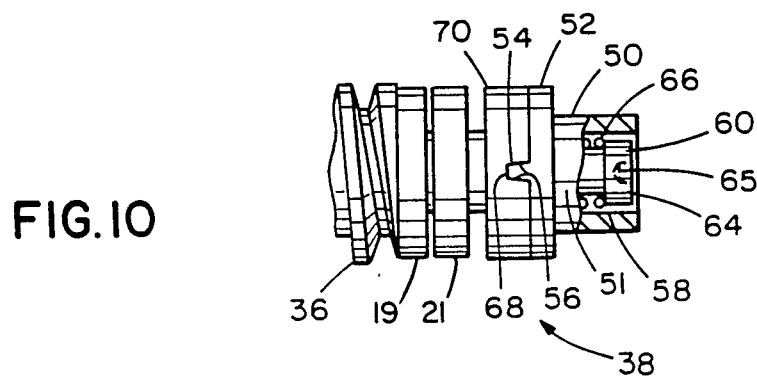
FIG. 10 is a partial side view and sectional view showing the slip clutch feature incorporated in the worm and gear assembly.

As best shown in FIGS. 9 and 10 of the Drawings, the driver shaft assembly includes a head 50 which has a hexnut top portion 51 with an integral collar portion 52 that is provided with a ridge 54 along its bottom surface. The base of the ridge adjacent the collar is wider than the top or extending portion of the ridge, i.e., the side walls 56 of the ridge converge at approximately 10° toward each other in the direction away from the hexnut portion. An aperture 58 extends centrally through the head of the driver shaft assembly including the hexnut, the collar and the ridge. A shoulder screw 60 having a hex recess extends through the aperture and is threadingly received within the driver shaft 62. The shoulder screw includes a head portion 64 with a hexagonal recess 65. The head portion 64 retains a coil spring 66 biasing the head 50 toward the driver shaft 62 of this assembly. A corresponding channel 68 is provided in the head 70 of the driver shaft 62 which is shaped and dimensioned to have a corresponding pitch of approximately 10° to receive the ridge 54. The driver shaft is provided with a threaded screw receiving recess 72 which is aligned with aperture 58 of the head. A screw locking material such as LOCTITE #TL-290 is applied to the screw threads to lock the screw within the driver shaft. A keyhole or groove 74 is provided in the body portion 76 of the driver shaft which as shown in FIG. 9 receives a key portion 78 of the worm. A suitable lubricating material or grease such as BEL-RAY #64982 is provided between the nut and driver shaft at the point where the ridge 54 meets the channel 68. The nut is designed to slip within a torque range of approximately 10–20 foot pounds when it is turned either clockwise or counterclockwise. The hexagonal recess 65 is then filled with a silicone rubber material, such as RTV732 silicone rubber manufactured by Dow Corning to discourage the application of torque to the shoulder screw which is locked within the driver shaft. The manual operation of the worm (36) through operation of the driver shaft assembly (38) rotates rom gear (34) causing movement of drive knob (30) to draw the circuit breaker in or out of its compartment (27). When the circuit breaker is moved to its fully connected position, the stop lever (43) has been rotated to a position wherein it is prevented from further movement by stop block (31). At this point, the driver shaft assembly (38) prevents excessive torque from being imparted to the worm as hereinabove described.

Figure 2:
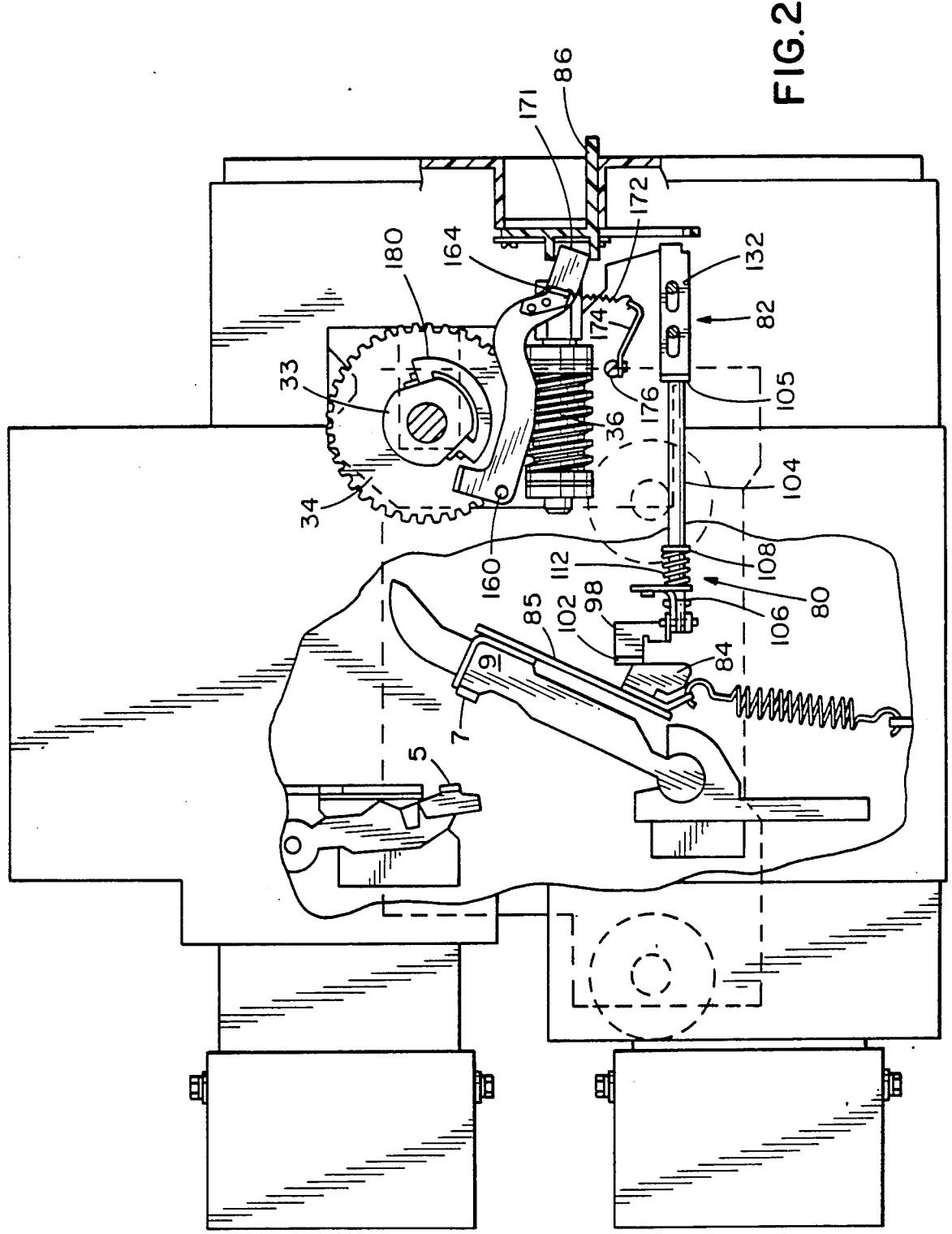
FIG. 2 is a side view along line 2—2 in FIG. 1 showing the interlock features of the present invention with the contact blades of the circuit breaker in the open position and the access door closed.
Figure 3:
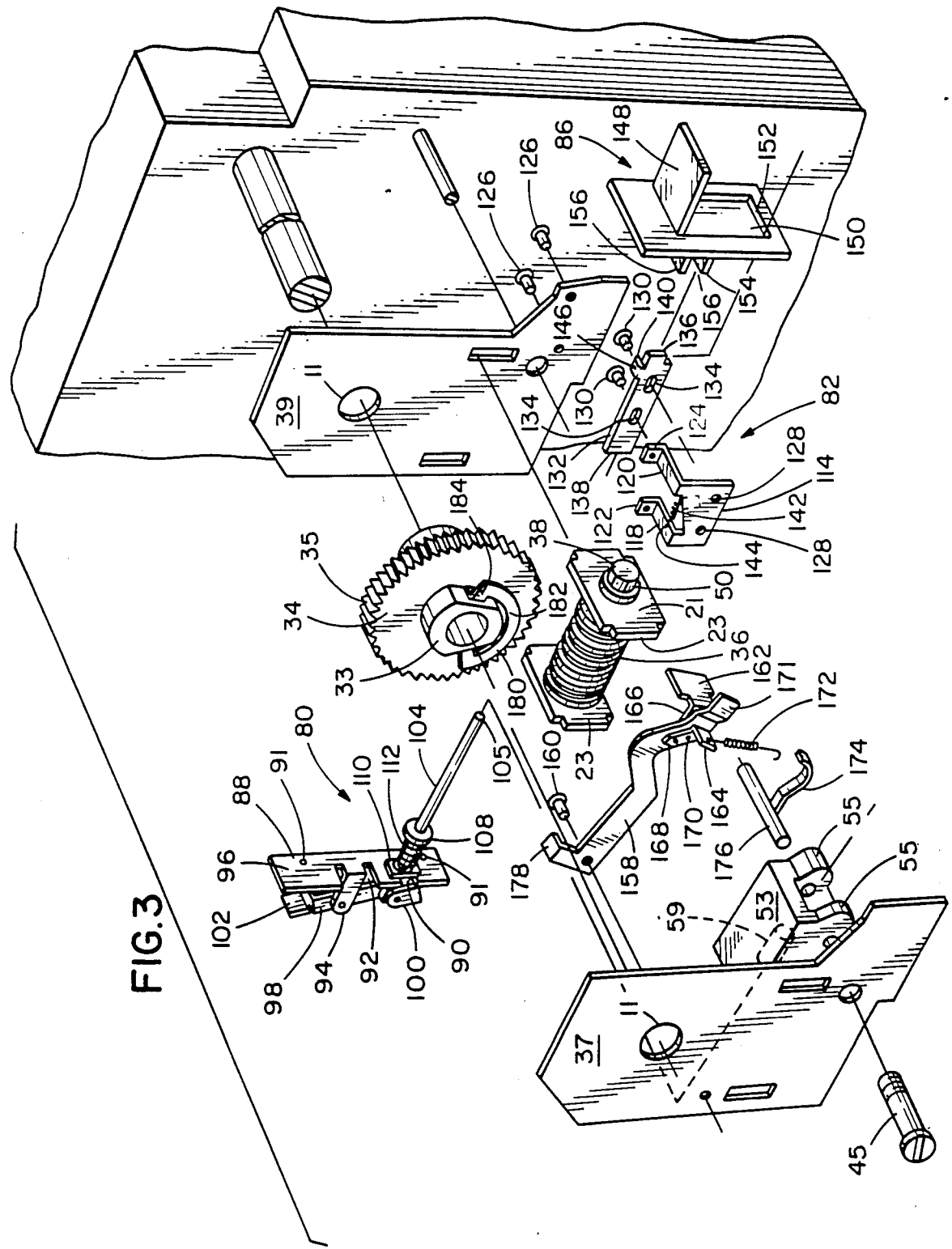
FIG. 3 is an exploded perspective view showing the interlock assembly.
Figure 7:
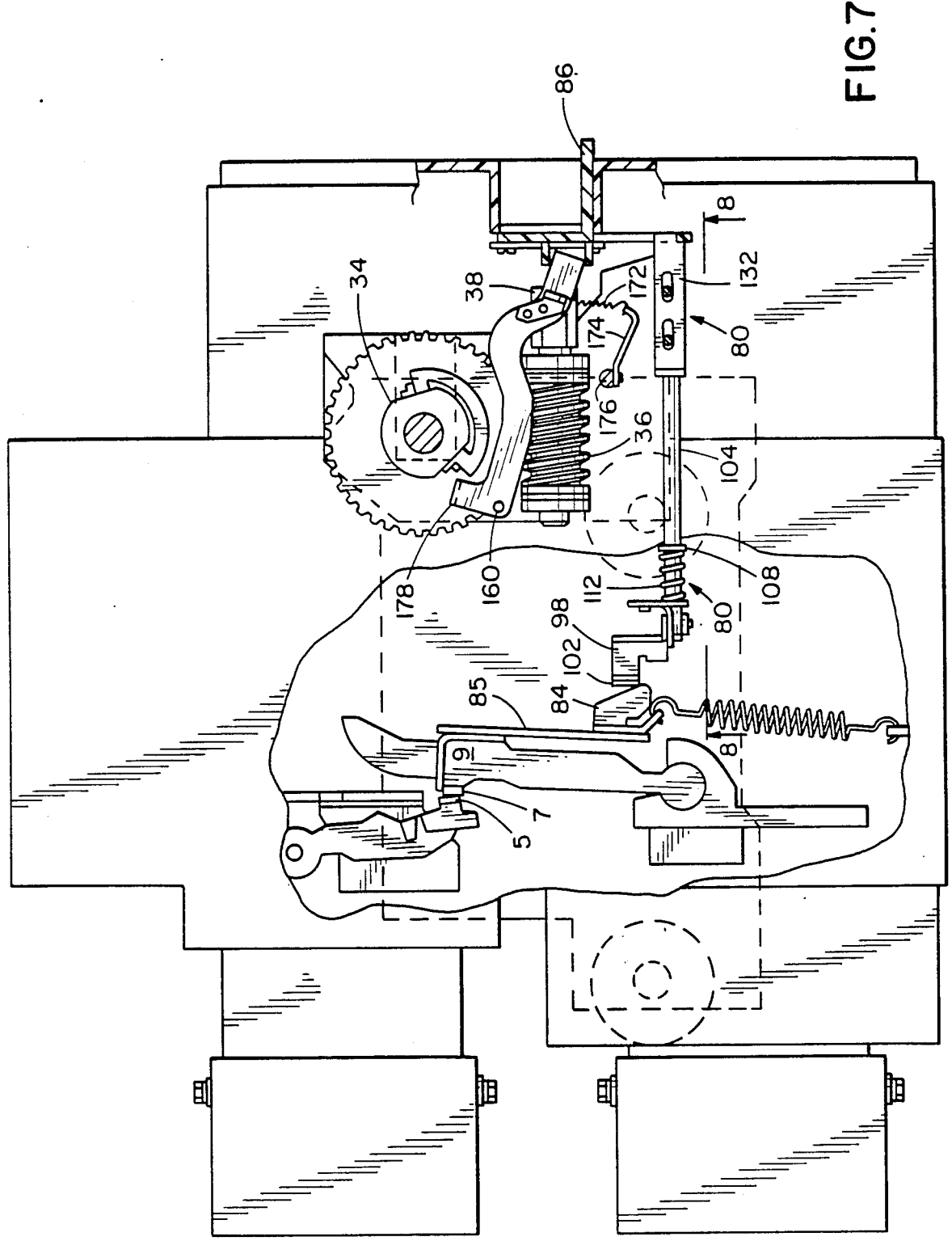
FIG. 7 is a side view as shown in FIG. 2 with the contact blades in the closed position and access door restrained closed.
Figure 8:
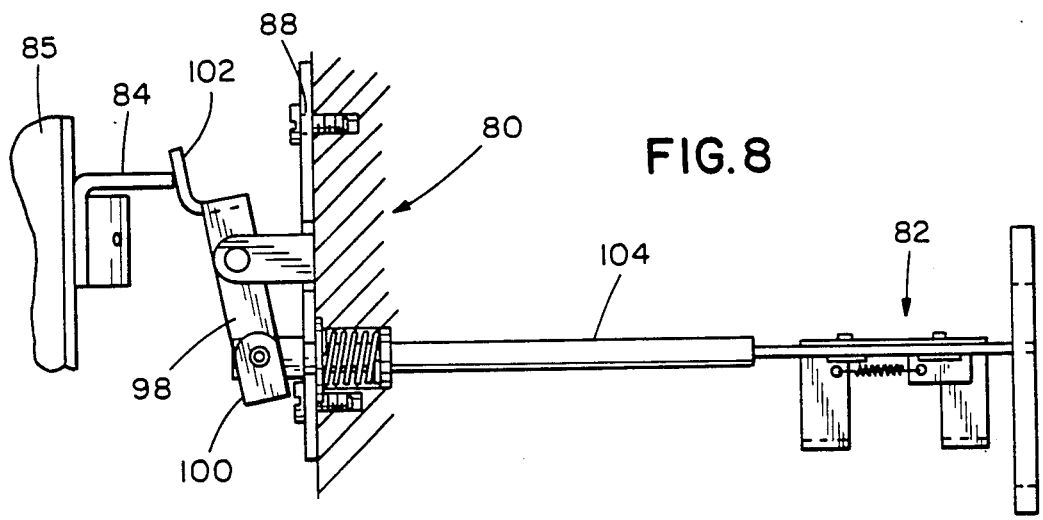
FIG. 8 is a side view showing the plunger and slider portions of the interlock assembly.

As previously mentioned, it is desirable to prevent operation of the drawout mechanism in the event the circuit breaker is closed. Accordingly, as seen from FIGS. 2, 3, 6, 7 and 8 a plunger assembly 80 and a slider assembly 82 are controlled by a plunger actuator 84 that is fixed to the blade carrier 85. The blade carrier which is described in the previously referenced application and shown in FIGS. 2, 6 and 7 causes actuation of the plunger assembly which controls the slider assembly that is operably associated with an access door 86 carried by the auxiliary cover 42 and covering access opening 40 when the door is in its closed position. The plunger assembly includes a plunger pivot bracket 88 which is secured to cover 44 by screws 89 which pass through bracket holes 91. The bracket 88 is provided with a first recess 90 and a second recess 92 having an adjacent support ear 94 extending inward at approximately 90° to the main face 96 of the bracket. The support ear 94 pivotally retains a generally L-shaped plunger lever 98 which includes a generally U-shaped bent portion 100 at one end and an actuating tab 102 extending from the other end of the plunger lever in generally parallel relationship with the face of the bracket and extending from the side of the plunger lever away from the bracket. A plunger 104 is pivotally connected at one end within the U-shaped portion of the plunger lever and extends through the first recess 90 of the bracket. A first plunger collar 106 is provided on the plunger intermediate the bracket surface and the plunger lever while a second plunger collar 108 is provided on the plunger on the opposite side of the bracket and spaced away from the bracket a predetermined distance. The plunger may extend through a spring guard 110 which captures a spring 112 between itself and the second plunger collar with the spring guard being urged against the face of the plunger bracket on the side of the bracket opposite the first plunger collar. The free end of the plunger 105 is in contact with the slider assembly.

The slider assembly 82 includes a mounting bracket 114 having a main surface 116 and a pair of mounting legs 118 and 120 in generally parallel planes, each leg having a respective mounting tab 122 and 124 which is secured to the brace plate 39 by fasteners 126. The main surface of the bracket is provided with a pair of apertures 128 through which a pair of shoulder rivets 130 extend to support the slider 132 which is a rectangular member having a pair of oblong openings 134 which are in registration with the apertures 128 on the main surface of the mounting bracket. The slider includes a stop tab 136 at one end with the opposite end 138 positioned to be engaged by the free end of the plunger 105. The slider is also provided with a tang 140 extending outward from the main surface of the bracket adjacent the stop tab toward the brace plate 39 to which the slider assembly is connected. A spring 142 is connected at one end through a hole 144 in leg 118 and at an opposite end through a hole 146 in the tang 140. Spring 142 biases the slider toward the plunger 105. When the contacts are opened the actuator 84 operates the plunger assembly to compress spring 112 with slider 132 following the plunger under the bias of spring 142. When the contacts are closed, spring 112 returns the plunger to a lock position which expands spring 142 moving the slider to a lock position.

The molded access door 86 is provided with a handle portion 148 and a window 150 through which a crank can be inserted to operate the draw-out mechanism. The window has a bottom ledge 152 which is engaged by the lower portion of stop tab 136 when the slider is moved to the lock position corresponding to a contact closed position of the circuit breaker contacts. A pair of molded stabs 154 form a channel 156 between them which relates to the trip interlock feature more fully addressed below.

It is also desirable to prevent closing the circuit breaker while the circuit breaker is only partially connected to the power bus. This is accomplished by maintaining the circuit breaker in a tripped position while the circuit breaker is between its "test" and "connected" positions. A trip arm 158 is pivotally supported adjacent one end by a shoulder rivet 160 connected to the brace plate 37. The opposite end of the trip arm carries a shield 162 on one side and a spring retainer 164 on the other side. Both the shield and retainer have respective leg portions 166 and 168 which may be fastened together on opposite sides of the trip arm by rivets 170. The shield covers the head 50 of the driver shaft assembly 38 and requires that the trip arm be raised prior to operating the driver shaft assembly in the event the auxiliary cover is removed. Damage can thereby be avoided to the cam and cam follower. A slightly offset extending portion is received within the channel 156 provided on the back side of the door 86. A spring 172 is connected at one end to the retainer 164 and at the opposite end to a trip lever 174 which is connected to a trip shaft 176 that is an extension of the trip shaft shown and described in the previous referenced application. The trip arm includes a cam follower portion 178 at its opposite end adjacent the point of pivotal connection to the brace plate 37. The cam follower portion is guided by a cam 180 which includes a semicircular cam surface 182 having mounting tabs 184 at each end which are connected by screws 186 to the hub 33 of worm gear 34 and extends a predetermined distance to maintain the breaker in the tripped position and the access door in its open position while the circuit breaker is between its "test" and connected positions.

While the invention has particularly been shown and described with reference to a preferred embodiment, it will be understood by those skilled in the art that variations and form, construction and arrangements may be made therein without departing from the spirit and scope of the invention. All such variations are intended to be covered in the appended claims.

We claim:

1. An improved drive mechanism for a worm gear mounted on a shaft to rotate the shaft about its longitudinal axis in response to operation of said drive mechanism with stop means provided to stop rotation of said shaft at a predetermined position, said mechanism comprising:
   a worm operably positioned to turn said worm gear;
   a driver shaft assembly including a first head having a top portion, a bottom surface and a central aperture extending longitudinally through said head, a ridge having side walls extending outward from said bottom surface and converging toward each other;
   a driver shaft connected to said worm to rotate said worm in response to rotation of said driver shaft, said driver shaft having a second head engaging said bottom surface of said first head and including portions defining a channel shaped and dimensioned to nestingly receive said ridge; and
   biasing means for connecting said first head to said second head and biasing said first head towards said second head to transfer rotational movement of said first head to said driver shaft through rotation of said ridge within said channel while permitting said ridge to withdraw from said channel in response to substantially predetermined torque being applied to said first head, said second head including a threaded aperture and said biasing means comprising a shoulder screw having a third head of a specified diameter, a central shaft portion having a lesser diameter than said third head and a threaded shaft portion, and a coil spring retained in said aperture of said first head about said central shaft portion and retained within said first head by said third head of said screw.

2. An improved drive mechanism as claimed in claim 1 wherein said side walls converge at an angle of approximately 10°.

3. An improved drive mechanism as claimed in claim 6 wherein said threaded shaft portion has a lesser diameter than said central shaft portion.

4. An improved drive mechanism as claimed in claim 3 including a lubricating material provided intermediate said ridge and said channel.

5. An improved drive mechanism as claimed in claim 4 wherein said third head of said shoulder screw is provided with a hexagonal recess, said third head being wholly received within said central aperture of said first head and filler means provided within said hexagonal recess for discouraging the application of torque to said shoulder screw.

* * * * *